Dec. 22, 1953  R. J. JOHANSEN  2,663,432
INCLINED ROTARY VACUUM FILTER
Filed May 19, 1950  2 Sheets-Sheet 1

Inventor
Rolf J. Johansen
By Young, Emery & Thompson
Attys.

Dec. 22, 1953  R. J. JOHANSEN  2,663,432
INCLINED ROTARY VACUUM FILTER

Filed May 19, 1950  2 Sheets-Sheet 2

Inventor
Rolf J. Johansen
By Young, Emery & Thompson
Attys.

Patented Dec. 22, 1953

2,663,432

UNITED STATES PATENT OFFICE 2,663,432

INCLINED ROTARY VACUUM FILTER

Rolf Jomar Johansen, Karlstad, Sweden, assignor to Aktiebolaget Kamyr, Karlstad, Sweden, a company of Sweden Application May 19, 1950, Serial No. 162,939

Claims priority, application Sweden May 23, 1949

8 Claims. (Cl. 210—202)

The present invention relates to a vacuum filter for dewatering and/or for washing of cellulose pulp, which filter consists of a vat for a suspension of cellulose pulp and of a rotary sieve drum partially immersed therein and having filtrate compartments on its inner side for the drainage of filtrate in the axial direction of the drum.

The main object of the invention is to provide a filter in which the filtrate flows rapidly out of said compartments.

Another object is to provide a filter in which the filtrate compartments slope towards the outlet in all their working positions.

A further object of the invention is to provide a filter having a reduced cross-sectional area of said compartments.

A still further object is to simplify the filter design and reduce the cost of manufacturing the same.

An important object of the invention is the provision of a washing filter in which different fractions of filtrate may be collected separately without intermixing.

Another object is to reduce the injurious air space within the filter, thereby improving the suction effect and counter-acting the tendency of foaming present when the filtrate consists of black liquor.

With these and other objects in view the invention resides essentially in that the axis of the sieve drum is arranged inclining at an angle to the horizontal plane.

Figure 1:
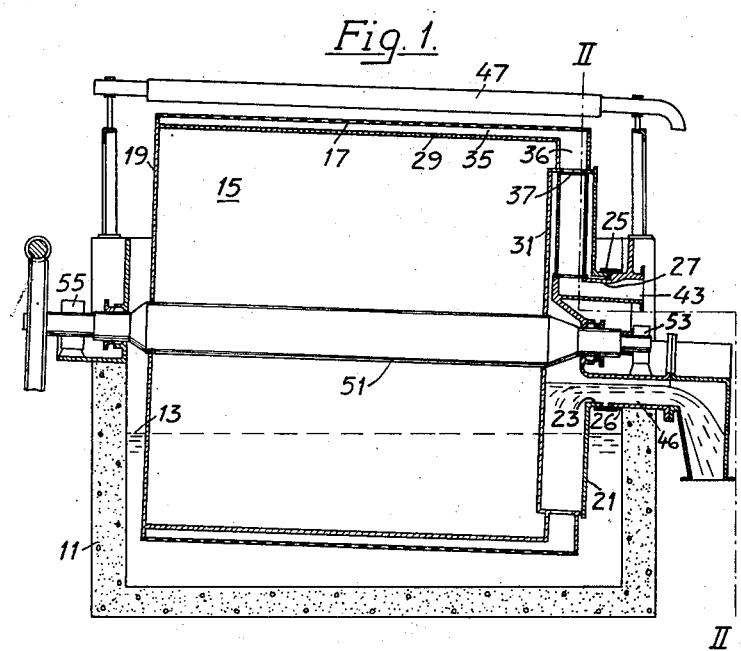
Figure 2:
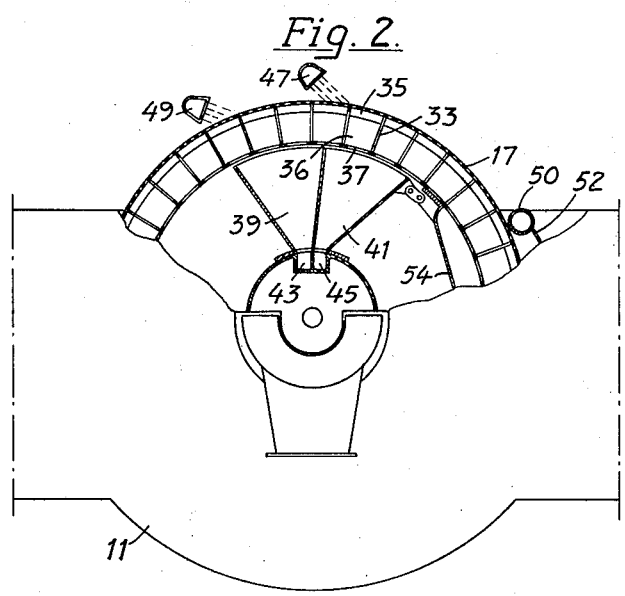
Figure 3:
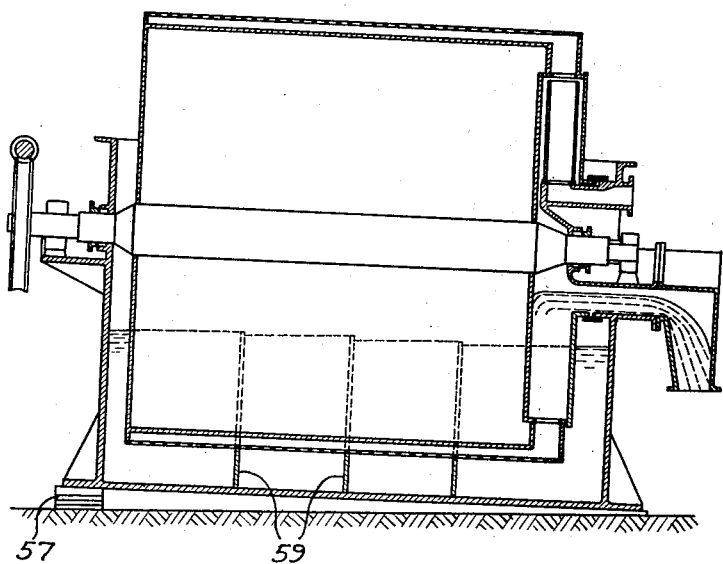

The invention will now be more closely described with reference to the accompanying drawings. Fig. 1 is a vertical sectional view of a first embodiment of the filter according to the invention, and Fig. 2 is an elevational view thereof taken from the outlet end and shown partly in section along the line II—II in Fig. 1. Fig. 3 is a vertical sectional view of a second embodiment.

In Figs. 1 and 2, 11 designates a concrete vat having a horizontal bottom and vertical side walls, which vat may either be cast integrally with the foundation or permanently placed thereupon in the shown, accurately horizontal position. Said vat is meant to contain the cellulose fibre suspension that is to be dewatered and washed by the filter. The normal level of the fibre suspension in the vat is designated by 13. A sieve drum 15 partially immersed into the fibre suspension is rotatably supported by the side walls of the vat. Said sieve drum consists of a perforated cylindrical shell 17 and end walls 19, 21. The end wall 21 has a concentric opening bordered by a cylindrical flange 23. A sealing tape 25 forms a seal between said flange on the turning drum end wall 21 and an adjacent flange 26 forming a part of a stationary supporting structure 27 which is mounted upon the vat and partly protrudes into the drum through the central opening in the end wall 21. Within the sieve shell the drum is provided with a concentric cylindrical inner shell 29 and an inner end wall 31. The shell 29 and the end walls 19, 31 form a closed chamber filled with air of atmospheric pressure. The annular space between the sieve shell 17 and the non-perforated inner shell 29 is divided by radial partitions 33 into a great number of shallow compartments 35 extending axially along the inside of the sieve shell. At their left-hand ends said compartments are closed, and at their right-hand ends they are provided with short radially directed extensions 36 having inwardly facing outlet openings 37. During the rotation of the drum said outlets pass successively over two collecting hoppers 39, 41 rigidly secured to the supporting structure 27. Said hoppers have separate outlets 43, 45 leading through the structure 27, and an outlet 46 is also provided from the space between the end walls 21, 31 to the outside. On the outside of the supporting structure 27 said three outlets are connected to a suction device, e. g. a barometric leg or a vacuum pump. Therefore, in operation of the filter the cells 35 and said space between the walls 21, 31 are held under a subatmospheric pressure. Pulp which is collected on the outside of the sieve shell due to the inwardly directed suction is discharged by a discharge roll 50 and a scraper 52. The outlets 37 opposite the discharge roll are blanked off from the vacuum in the drum by means of a stationary shoe 54, whereby the pulp layer is more easily removed. Sprinkle tubes 47, 49 for supplying washing liquid are arranged near the outer side of the sieve drum.

The shaft 51 of the sieve drum is journalled in two bearings 53, 55, the bearing 53 at the outlet end of the drum being positioned at a lower level than the bearing 55 at the opposite end of the drum. The level difference between the bearings is so great that the inclination of the shaft 51 and of the axis of the drum amounts to about 2 degrees. Said inclination relatively to the horizontal plane has proved to give a sufficiently rapid discharge of the filtrate entering the compartments, so that the filtrate that is sucked off the pulp layer deposited on the sieve surface of the filter and that enters into a particular compartment when the same takes the position above the hopper 39, actually runs down into said hopper and is not delayed so as to partially run into the hopper 41 instead. In certain instances an inclination angle of 4° to 5° may be of advantage. With such a small inclination of the drum the axially directed pressure on the bearings 53, 55 is rather insignificant, so that normal bearings may be used, but if necessary, bearings specially designed for resisting axial thrust may be substituted.

The magnitude of the inclination is dependent upon the length of the filter drum, the speed thereof, the number of filtrate fractions to be collected separately, etc., but needs hardly in any case exceed 1 to 5, i. e. the tangent for the angle of inclination is equal to or less than 1/5. As another extreme, inclination values of 1 to 50 or less have too small an effect on the drainage to be used. In filters of common sizes and types the inclination of the drum axis preferably lies between 1 to 30. With an inclination of 1 to 5 the inclination of the hypotenuse of a triangle is meant, having a horizontal side measuring 5 inches and a vertical side measuring 1 inch.

The inclination angle is $\alpha_1$, and $$\tan \alpha_1 = \frac{1}{5}$$

From a trigonometric table one finds that $\alpha_1$ is 11°20'. Similarly, with an inclination of 1 to 50, one means an inclination angle, the tangent of which is $$\frac{1}{50}$$

i. e. $\tan \alpha_2 = 0.02$, which gives $\alpha_2 = 1°10'$.

As shown in Fig. 1, the drum is immersed into the pulp suspension over a part of the periphery which is greater at its outlet end than at its opposite end. As a consequence thereof the pulp layer deposited on the sieve surface is gradually thicker towards the outlet end of the drum. In order to eliminate disadvantages on account thereof, according to the invention measures are taken to counteract such uneven depositing. For instance, diluting liquid may be introduced into the vat at its right-hand end in order to maintain different pulp concentrations along the length of the drum, the concentration decreasing towards the outlet end, whereby the pulp deposit will be uniformly thick in spite of the fact that the drum is immersed to a greater depth and therefore a greater quantity of liquid filters through the same at the outlet end than elsewhere.

Fig. 3 shows a filter of a design essentially similar to the filter according to Figs. 1 and 2. However, in this embodiment of the invention the drum is supported by the vat walls in the usual manner with both ends located equally high relatively to the vat, but the filter as a whole is placed in an inclined position. The desired inclination is caused by spacer blocks 57 placed underneath the vat at the end opposite to the outlet end of the drum. By changing the number or the height of the blocks the inclination may easily be adapted to working or other conditions and the most favorable angle of inclination may be found out experimentally.

In order to counteract uneven pulp depositing, the vat which is made of sheet metal, is provided with partitions 59 placed at right angles to the axis of the drum and extending close up to the rotary sieve shell. Said partitions make it possible to maintain a stepped pulp suspension level in the vat, so that the depth of immersion of the drum is essentially the same along its entire length.

I claim:
1. In a vacuum filter, a rotary drum mounted on a substantially horizontal axis of rotation and comprising a cylindrical perforated shell and suction compartments having a uniform cross section and extending parallel to the axis of rotation along the inner side of said shell, said drum being mounted in its working position with one end in a higher position than the other end relative to the horizontal, and suction compartment outlets in the lower end of the drum, whereby all suction compartments slope towards their outlet ends.

2. A vacuum filter comprising an open top vat adapted to receive a fibre suspension, a rotary filter drum mounted on a substantially horizontal axis of rotation and having a cylindrical perforated shell and axially extending suction compartments at the inner side thereof, said suction compartments having a uniform depth substantially over their entire length, said drum being mounted in an inclined position in said vat relative to the horizontal so as to extend partially above the top of the vat and partially immersed into the fibre suspension therein, one of the ends of the drum relative to its axis of rotation being immersed to a greater depth than the other, and a plurality of outlets for the compartments at the lower end of the drum.

3. A filter for dewatering and washing fibrous pulp comprising a rotary cylindrical sieve drum mounted on a substantially horizontal axis of rotation and adapted to receive a layer of wet pulp to be carried thereby, separate filtrate compartments extending along the inner surface of said sieve drum in the axial direction thereof and having outlets at a lower end of the sieve, said suction compartments having bottom and side partitions parallel to the axis of rotation of the drum, means adapted to connect said compartments to a vacuum means, a plurality of stationary hoppers each with an outlet for collecting different filtrate fractions discharged through said first-mentioned outlets, and means mounting said sieve drum for rotation about its axis forming a slight angle relative to the horizontal, thus providing lower and upper ends.

4. A filter as claimed in claim 3, in which the inclination of the axis of the cylindrical sieve is of a magnitude in which the angle between the axis of the rotation of the cylindrical sieve drum and the horizontal plane lies between 11°20' and 1°10'.

5. A filter as claimed in claim 3, in which the axis of rotation of the sieve drum forms an angle of 2 to 5 degrees relative to the horizontal.

6. In a vacuum filter, a sieve drum comprising a rotary shaft mounted at an angle of approximately 11°20' to 1°10' relative to the horizontal so that one end of the drum is higher than the other end relative to the axis of rotation, an outer cylindrical perforated shell, an inner cylindrical shell concentric to said outer shell, a plurality of radial partitions between said outer and inner shells dividing the annular space therebetween into axially extending compartments, a drum head closing said two shells at the higher end and attaching them to the shaft, an inner drum head closing the end of the inner shell at the lower end and attaching the same to the shaft, an outer drum head joined to the lower end of the outer shell and having a central aperture, a stationary structure extending through said aperture in the outer drum head and being sealed thereto, and a filtrate collecting hopper between said inner and outer drum heads at the lower end and supported by said stationary structure, said stationary structure having passages therethrough for connection of said hopper and of the space between said inner and outer drum heads to an exterior vacuum generating device.

7. In a vacuum filter, an open top vat adapted to receive a fibre suspension, a rotary sieve drum mounted on a substantially horizontal axis of rotation and extending partially into the vat for partial immersion into said suspension in a position inclined relative to the horizontal, an angle of approximately 11°20′ to 1°10′, means for connection to a means for maintaining a sub-atmospheric pressure within said drum, outlet means at the lower end of the drum, and partitions in said vat for maintaining a higher level of fibre suspension at one end of the vat than at the other relative to the horizontal.

8. A vacuum filter as claimed in claim 7, in which the vat is provided with transverse partitions arranged close to the bottom part of the sieve drum.

ROLF JOMAR JOHANSEN.

References Cited in the file of this patent

UNITED STATES PATENTS

| Number | Name | Date |
|---|---|---|
| 785,531 | Weller | Mar. 21, 1905 |
| 869,720 | Matthias | Oct. 29, 1907 |
| 1,085,547 | Couper | Jan. 27, 1914 |
| 1,667,465 | Wait | Apr. 24, 1928 |
| 1,748,081 | Reed et al. | Feb. 25, 1930 |
| 1,805,499 | Schur | May 19, 1931 |
| 1,859,642 | Woodworth | May 24, 1932 |
| 1,995,904 | Sherman | Mar. 26, 1935 |
| 2,263,168 | Dorr et al. | Nov. 18, 1941 |
| 2,510,254 | Richter | June 6, 1950 |